United States Patent [19]

Hoefner

[11] Patent Number: 4,809,781

[45] Date of Patent: Mar. 7, 1989

[54] METHOD FOR SELECTIVELY PLUGGING HIGHLY PERMEABLE ZONES IN A SUBTERRANEAN FORMATION

[75] Inventor: Mark L. Hoefner, Dallas, Tex.

[73] Assignee: Mobil Oil Corporation, New York, N.Y.

[21] Appl. No.: 171,072

[22] Filed: Mar. 21, 1988

[51] Int. Cl.$^4$ ...................... E21B 43/16; E21B 33/138
[52] U.S. Cl. .................................. 166/273; 166/292; 166/300; 166/305.1
[58] Field of Search ............... 166/273, 285, 292, 300, 166/305.1, 270

[56] References Cited

U.S. PATENT DOCUMENTS

| | | | |
|---|---|---|---|
| 4,190,109 | 2/1980 | Barton, Jr. | 166/273 |
| 4,343,363 | 10/1982 | Norton et al. | 166/300 |
| 4,606,407 | 10/1986 | Shu | 166/275 |
| 4,658,898 | 4/1987 | Paul et al. | 166/275 |
| 4,665,985 | 5/1987 | Berrod et al. | 166/292 |

*Primary Examiner*—Stephen J. Novosad
*Assistant Examiner*—Terry Lee Melius
*Attorney, Agent, or Firm*—Alexander J. McKillop; Charles J. Speciale; Lawrence O. Miller

[57] ABSTRACT

Relatively high permeability zones in a subterranean formation vertically bounded by relatively low permeability zones are selectively plugged by first injecting a solidifiable selective gel solution, preferably a xanthan/chromium gel solution, at a pressure sufficient to cause the gel solution to coat and temporarily plug the injection face of the low permeability zones without any significant amount of the gel penetrating the low permeability zones while allowing the gel solution to flow into the relatively high permeability zones. Reasonably promptly thereafter and before the selective gel solution solidifies in the high permeability zones, a solidifiable non-selective solution is injected into the formation that preferentially enters the relatively high permeability zones and allowed to solidify and plug the relatively high permeability zones. Thereafter, a flushing agent having a gel breaker is injected into the formation that removes the selective gel coating from the face of the relatively low permeability zones thereby restoring permeability of the face of these zones. Thereafter, flooding fluids injected into the formation will preferentially enter the low permeability oil-rich zones to improve sweep efficiency and total oil recovery from the formation.

7 Claims, No Drawings

METHOD FOR SELECTIVELY PLUGGING HIGHLY PERMEABLE ZONES IN A SUBTERRANEAN FORMATION

FIELD OF THE INVENTION

This invention relates to recovering oil from subterranean formations and more particularly to selectively plugging high permeability zones of the formation without plugging low permeability zones to improve the injectivity profile and/or vertical conformance of the formation.

BACKGROUND OF THE INVENTION

In the recovery of oil from oil-bearing subsurface formations, it usually is possible to recover only minor portions of the original oil in place by the so-called primary recovery methods which utilize only the natural forces present in the formation. Thus, a variety of supplemental recovery techniques have been employed in order to increase the recovery of oil from subsurface formations. The most widely used supplemental recovery technique is waterflooding which involves the injection of water into an oil-bearing formation. As the water moves through the formation, it acts to displace oil therein to a production system composed of one or more wells through which the oil is recovered. Many waterfloods have gone on for many years in the same formations.

The performance of a waferflood can be affected by the different types of rock in which the oil has been deposited. It is well known that many oil reservoirs are comprised of more than one oil-producing layer. These layers exist at different depths in the formation. Often, oil is produced from several distinct zones (layers) which may or may not be physically situated adjacent to one another in the reservoir. Different oil-producing zones usually consist of rock with different physical properties, and there is no reason to expect that the different oil-producing layers in a particular reservoir should in any way be similar.

One of the most important factors affecting oil production is the ability of the rock comprising the oil-bearing zone or zones to transmit flow under an imposed pressure gradient. The property used to describe the conductivity of a porous solid to fluid flow is called permeability. If fluid flows relatively easily through zone type of rock under a fixed pressure driving force, then that rock is said to have a high permeability. If it is very difficult to force fluid through a type of rock, then that rock has a low permeability.

In a reservoir, the materials comprising the different oil-producing layers usually have different permeabilities. Oil and water will usually flow much more easily through some of the layers than through others, simply because the physical makeup of the rock is different in the various oil-producing zones. If a reservoir containing multiples zones (a layered reservoir) is involved in a waterflood treatment, it is well known that the zones with the higher permeabilities and greater thicknesses will receive more water than the low-permeability or thin zones. Furthermore, once water passes through a zone and pushes some of the oil out, the permeability of that zone to the injected water increases even more. The net effect is that in many cases, the overwhelming majority of the water that is injected throughout the life of a waterflood passes cleanly through the high permeability zones, and very little water enters the low permeability zones. In fact, it is often very difficult to make any appreciable amount of water enter low-permeability zones if there are higher permeability zones in the formation to take the water. Oil originally in place in the high permeability zones is eventually displaced relatively efficiently, while oil trapped in the low permeability zones remains largely unrecovered thereby resulting in relatively poor sweep efficiency of the aqueous flooding agent.

To improve recovery from layered reservoirs, one needs to direct a greater fraction of the injected water into the low permeability zones. Treatments designed to do this alter the flow fractions or flow profile to the different oil-bearing zones and are thus called "profile modification" treatments. Various methods have been to try to alter the distribution of water flow to the various zones. One such method is a polymer gel treatment that has been used with success in certain instances. In this type of treatment, an aqueous polymer solution is crosslinked, or reacted, to form a stable gel. After crosslinking, the gel is injected into the water-injection wells. The gel flows into all of the oil-producing zones, but primarily into the high permeability zones because the resistance to flow into those areas is the lowest. Once in place in the high permeability areas of the reservoir, the polymer undergoes a partial re-gellation in the porespace of the rock. The effect of placing gel in the porespace in this way is to partially plug, or reduce permeability in the high permeability streaks. When water injection is resumed, the water will encounter a greater flow resistance than before in the high permeability zones. In this way water can be redirected into previously unswept (low permeability) zones.

In general, polymer gel treatments for profile modification have a serious drawback which in many cases can cause the treatments to reduce the efficiency of the waterflood instead of increasing it. When the gel is injected, it flows like a liquid. The majority of the gel does flow into the the high permeability area, but some fraction of the gel also flows into the low permeability zones. Gel that enters the low permeability streaks also results in partial plugging of those areas. And because permeability reduction very near the wellbore has a much greater effect on the overall flow profile than does plugging further into the formation, any gel that penetrates significantly into the low permeability zone can negate any beneficial effects of the treatment. Furthermore, gels tend to have a greater permeability reducing effect in rock having a low permeability to begin with. These effects can lead to a situation where even when the majority of the gel enters the high permeability area, the relative permeability reduction in the low permeability area is greater. That is, the low permeability zones get plugged more than the high permeability zones, and this is the exact opposite of the desired result. When this happens, the net effect of the treatment is to increase rather than decrease the fractional flow of water to the already cleanly-swept high permeability zones.

In some cases, it is possible to use mechanical means to inject the gel only into the high permeability streaks and avoid any gel placement in the low permeability zones. This is done by sealing off those sections of the wellbore where gel placement is not desired, using packers, chokes in injection strings, etc., and injecting only into selected (high permeability) areas. When mechanical diversion can be accomplished, it is a very effective means of treating selected zones. The technique often fails however, because fluid either leaks past the packing devices used to confine injection to a single zone, or because gel flows along the outside of the wellbore from the zone that is to be plugged to nearby low permeability zones. Gel that inadvertently enters the low permeability areas can plug very effectively and the treatment can essentially cause more harm than good. Additional costs are also incurred whenever mechanical packing equipment is used in a well treatment.

Polysaccharide biopolymers, such as xanthan gels, cellulose derivatives, guargum, etc., are useful for permeability profile control in the consolidated gel-forms. Chromium consolidated xanthan gel has been used with success to avoid some of the serious cost and failure problems associated with mechanical zone isolation. The xanthan/chromium gel system has a very attractive properly that causes preferential diversion of the polymer into higher permeability zones without the use of mechanical diversion. This property is called selective penetration. A polymer that exhibits selective penetration will show preferentially in the high permeability streaks when both high and low permeability streaks are present. In this situation, one would normally expect a distribution of flow into various zones in the reservoir depending only on the height of each zone and its permeability. The xanthan/chromium gel, however, tends to flow in greater proportion into the higher permeability streaks than would be expected even when the zone height and permeability are accounted for. The high permeability zones are more effectively plugged and undesirable plugging of the low permeability zones is reduced. When waterflooding is resumed, the result is a net decrease in water flow in the high permeability streaks and better oil displacement in low permeability areas.

Because of its selective penetration characteristic, the xanthan/chromium gel is a very attractive gel for profile modification. A drawback of the xanthan/chromium system is its low temperature stability limit. At temperatures above about 140 degrees Fahrenheit, the xanthan eventually thermally degrades and is useless in diverting water flow. Thus the xanthan/chromium gel cannot be used in reservoirs above 140 degrees. This is a very serious limitation as the majority of reservoir temperatures exceed 140 degrees.

In some types of zone-specific treatments, diverting agents in the form of finely ground solids can be used to direct the flow into the desired zone of a formation. An example is the acid treating of reservoirs to increase the permeability in low permeability zones. Here, the goal is to inject acid only into the low permeability streaks, and finely ground silica flour is sometimes added to the acid for this purpose. The solids flow primarily to the high permeability zone because that is where the majority of the flow goes. The particulates, being too large to enter the rock matrix, form a filter cake on the surface of the high permeability zone. The filter cake provides additional resistance to flow, and the result is a net diversion of fluid to the low permeability zone. The filter cake can be easily removed.

The present invention provides a method wherein a selective gel system, preferably a xanthan/chromium constructed polymer gel system, which exhibits the property of selective penetration for the purpose of profile modification, is used in conjunction with another, solidifiable non-selective material such as a gel, polymer or monomer to make the non-selective material behave selectively. In this way, oil reservoirs above the temperature limit of xanthan/chromium gels can be treated in a selective manner with more temperature stable non-selective gels and without mechanical zone isolation, and low temperature wells which although can be treated with xanthan/chromium gels can in addition be treated with non-selective gels that are more effective plugging agents than xanthan/chromium gels. The present process involves injecting a relatively small volume of a selective gel solution, preferably a xanthan/chromium gel, into the formation at a predetermined pressure to cause the gel to temporarily plug the face of the low permeability zones near the injection well while allowing the gel solution to flow into the relatively high permeability zones. Reasonably promptly thereafter and before the selective gel solution solidifies in the high permeability zones, injection of larger volumes of the solidifiable non-selective material will preferentially enter the high permeability zones and allowed to solidify and plug these zones. Thereafter, the gel plugging the face of the low permeability zones is removed by a flushing agent containing a gel breaker thus allowing subsequently injected flooding fluids to penetrate the oil-rich low permeability zones for the recovering to oil. If used without pre-injecting the selective gel system, the non-selective material would penetrate and reduce permeability in all zones to a comparable degree, and any subsequent flooding fluid injection profile would not be improved. Unlike mechanical isolation techniques, the process of the present invention can be used without the risk of plugging low permeability zones with gel.

SUMMARY OF THE INVENTION

The present invention is directed to a method for selectively plugging relatively high permeability zones in a subterranean formation having relatively high permeability zones and relatively low permeability zones penetrated by at least one injection well in fluid communication with a substantial portion of the formation comprising first injecting a predetermined amount of a selective gel solution, preferably a xanthan/chromium gel solution, into the formation via the injection well at a predetermined pressure sufficient to cause the gel to coat and temporarily plug the face of the relatively low permeability zones near the injection well without any significant amount of gel penetrating the relatively low permeability zones while allowing the gel solution to flow into the relatively high permeability zones. Reasonably promptly thereafter and before the selective gel solution in the high permeability zones solidifies, a predetermined amount of a solidifiable non-selective solution is injected into the formation via the injection well that preferentially enters the relatively high permeability zones and allowed to solidify and plug these zones. After plugging the relatively high permeability zones, a predetermined amount of a flushing agent having a breaker material is injected into the formation via the injection well that removes the selective gel coating from the face of the relatively low permeability zones thereby restoring permeability of the face of the relatively low permeability zones to fluids. Thereafter, flooding fluids are injected into the formation that preferentially enter the relatively low permeability zones to displace oil toward a production well from which it is recovered.

DESCRIPTION OF THE PREFERRED EMBODIMENTS

The present invention relates to a process for selectively plugging relatively high permeability zones in a subterranean formation bounded by relatively low permeability zones without the aid of mechanical equipment and without plugging the low permeability zones. The process comprises first injecting a predetermined amount of a selective gel solution, preferably a xanthan/chromium gel, into the formation under a predetermined pressure sufficient to cause the gel to coat and temporarily plug the face of the relatively low permeability zones near the injection well without any significant amount of the gel penetrating the low permeability zones while allowing the gel solution to flow into the relatively high permeability zones. Reasonably promptly thereafter and before the selective gel solution in the relatively high permeability zones solidifies, a larger amount of a solidifiable non-selective solution is injected into the formation that preferentially enters the relatively high permeability zones and allowed to solidify and plug the relatively high permeability zones. Thereafter, a flushing agent having a breaker material is injected into the formation that removes the selective gel coating from the face of the relatively low permeability zones thereby restoring permeability of the face of these zones to fluids. More particularly, the present method is applied to a subterranean formation, preferably a formation having a temperature of at least 140° F., and having relatively high permeability zones and relatively low permeability zones penetrated by at least one injection well and at least one spaced apart production well. The injection and production wells are perforated to establish fluid communication with a substantial portion of the formation. The injection and production wells may be located and spaced from one another in any desired orientation. For example, the line drive pattern may be utilized in which a plurality of injection wells and a plurality of production wells are arranged in rows which are spaced from another. Exemplary of patterns which may be used are those wherein a plurality of production wells are spaced about a central injection well or conversely a plurality of injection wells spaced about a central production well. Typical of such well arrays are the five spot, seven spot, nine spot and thirteen spot patterns. The above and other patterns for effecting secondary recovery operations which may be applied in using the present method are illustrated in U.S. Pat. No. 3,927,716, Burdyn et al, the disclosure of which is hereby incorporated by reference.

In the first step of the present invention, a predetermined amount of a selective gel solution, preferably a xanthan/chromium gel solution, is injected into the formation via the injection well at a predetermined pressure sufficient to cause the gel to coat and temporarily plug the face of the relatively low permeability zones near the injection well without any significant amount of gel penetrating the low permeability zones while allowing the gel solution to flow into the relatively high permeability zones.

The xanthan/chromium gel is injected in the form of an aqueous solution in amounts of from about 0.05 weight percent to about 1.0 weight percent, preferably about 0.2 weight percent. The quantity of xanthan/chromium gel injected into the formation will vary depending upon formation characteristics and the degree of plugging desired.

To illustrate the mechanism of selectively plugging the face of the relatively low permeability zones, at an extremely high injection pressure, the gel will penetrate and flow into both the low permeability zones and the high permeability zones. Depending upon the permeability difference of the two zones, flow into the lower permeability zones may eventually stop, however, by this time the degree of gel penetration into the low permeability zones is already detrimental. By reducing the injection pressure to a predetermined pressure, the injected gel will flow relatively freely into the high permeability zones, but the face of the low permeability zones near the injection well will be plugged before any sufficient amount of gel penetrates the low permeability zones. A further lowering of the injection pressure will eventually result in plugging both the low permeability and high permeability zones near the injection face, which is also undesirable.

Suitable xanthan/chromium gel systems useful in the present invention may contain 2000–4000 ppm xanthan (0.2 to 0.4 weight percent), 40–80 ppm chromium, 100–200 ppm sodium hydroxide and 500 ppm formaldehyde to prevent biodegradation. Sodium hydroxide concentrations are in addition to acid or base required to neutralize the xanthan broth to a pH of 7. A preferred xanthan/chromium gel solution comprises 2000 ppm xanthan, 80 ppm chromium (in the $3^+$ state), 100 ppm sodium hydroxide and 500 ppm formaldehyde mixed in a brine containing 5 weight percent sodium chloride and 0.5 weight percent calcium chloride.

The xanthan utilized in this invention can be a commercial product. Included among these polymers which are useful in this invention are polymers sold under the tradenames "Flocon" by Pfizer Inc. Chemical Division and "Kelzan" by Kelco.

The xanthan/chromium gel is usually made with reservoir brine as the aqueous phase, and because xanthan is relatively insensitive to salinity, these gels perform well under a wide range of salt concentration.

Although a xanthan/chromium gel solution is preferred as the selective gel solution to plug the face of the low permeability zones, the selective gel may be any polysaccharide or polyacrylamide or any other crosslinked or uncrosslinked polymer gel system which exhibits selectivity. In addition, the selective gel solution can be a xanthan and a crosslinker selected from the group consisting of metal and organic crosslinking agents. Suitable selective gel solutions useful in the present invention are disclosed in U.S. Pat. Nos. 4,653,585 and 4,658,898 which are assigned to the assignee of the present invention and are hereby incorporated by reference.

Reasonably promptly after injecting the selective gel solution that temporarily plugs the face of the low permeability zones near the injection well and before the selective gel solution solidifies in the relatively high permeability zones, a predetermined amount of a solidifiable non-selective solution is injected into the formation via the injection well that due to the plugged face of the relatively low permeability zones is prevented from flowing into the low permeability zones and preferentially enters the relatively high permeability zones and allowed to solidify and plug the relatively high permeability zones. Examples of suitable solidifiable non-selective solutions available from chemical suppliers include Halliburton's K-trol polyacrylamide system, Phillips HE polymers, or any similar system. Concentrations of polymers in aqueous gelling mixtures is between 0.1 and 10 weight percent.

The solidifiable non-selective solution which follows injection of the selective gel solution need not be a gel or even a polymer when injected. It can be any fluid system which can be injected into the formation and which then will react in some way to form a stable solid or semi-solid structure which will divert subsequently injected flooding fluids away from those regions. It can be any polysacharride or polyacrylamide or any other suitable polymer which is crosslinked either prior to injection or in-situ to form a stable gel. The non-selective solution can also be a monomer such as unpolymerized acrylamides which when injected polymerizes to form a stable gel in-situ. The quantity of non-selective gel solution injected into the formation will depend upon formation characteristics and the degree and depth of plugging desired.

After plugging the relatively high permeability zones, a predetermined amount of a flushing agent, such as water, having a gel breaker is injected into the formation via the injection well to remove the solidified selective gel plugging the face of the relatively low permeability zones. Suitable gel breakers include enzymes and oxidizing agents such as sodium persulfate, ammonium persulfate, perchlorate and hydrogen peroxides. These chemicals are readily available from chemical suppliers and with the exception of enzyme breakers are sold under their chemical names. Enzyme breakers can be obtained from oil field service companies. The amount of gel breaker contained in the flushing agent will vary from about 1.0 weight percent to about 10 weight percent, preferably about 5 weight percent of the flushing agent mixture. The amount of flushing agent having a gel breaker injected into the formation will vary depending upon formation characteristics, particularly formation temperature, because high formation temperature will eventually completely degrade the selective gel due to its instability at high temperature, thereby requiring less gel breaker. Removing the selective gel coating from the face of the relatively low permeability zones restores permeability of these zones to fluids. Thereafter, a flooding fluid such as $CO_2$, thickened water, brine, steam, in situ combustion front and the like, are injected into the formation via the injection well which after the above treatment preferentially enters the relatively low permeability oil-rich zones and fluids including oil are recovered from the production well until oil is depleted from these zones.

The present invention can also be utilized in an oil recovery process wherein a flooding fluid such as water, steam, in situ combustion or carbon dioxide is first injected into the formation that preferentially invades the relatively high permeability zones in the formation and displaces oil from these zones to a production well from which the oil is recovered. After the higher permeability zones have been depleted of oil, the process of the present invention may be employed to selectively plug the oil-swept high permeability zones of the formation and allow subsequently injected flooding fluids to penetrate the low permeability oil-rich zones which were originally not invaded by the flooding fluid thereby resulting in improved sweep efficiency and enhanced oil recovery.

From the foregoing specification, one skilled in the art can readily ascertain the essential features of this invention and without departing from the spirit and scope thereof can adapt it to various diverse applications. It is my intention and desire that my invention be limited only to those restrictions or limitations as are contained in the claims appended hereinafter below.

I claim:

1. A method for selectively plugging relatively high permeability zones in a subterranean formation having relatively high permeability zones and relatively low permeability zones penetrated by at least one injection well in fluid communication with a substantial portion of the formation comprising the sequential steps of:
   (a) injecting a predetermined amount of a solidifiable selective gel solution comprising xanthan chromium (in the 3+ state), sodium hydroxide and formaldehyde in a brine solution containing sodium chloride and calcium chloride into the formation via the injection well at a predetermined pressure sufficient to cause the gel solution to coat and temporarily plug the face of the relatively low permeability zones near the injection well without any significant amount of gel penetrating the relatively low permeability zones while allowing the gel solution to flow into the relatively high permeability zones;
   (b) thereafter injecting a predetermined amount of a solidifiable non-selective solution comprising polyacrylamides, polysaccharides and unpolymerized acrylamide monomers into the formation via the injection well before the previously injected selective gel solution solidifies in the relatively high permeability zones that preferentially enters the relatively high permeability zones and allowing the injected non-selective solution to solidify and plug the relatively high permeability zones; and
   (c) injecting a predetermined amount of a flushing agent having a gel breaker into the formation via the injection well that removes the selective gel coating from the face of the relatively low permeability zones thereby restoring premeability of the face of the relatively low permeability zones to fluids subsequently injected into the formation.

2. The method of claim 1 wherein in step (a) the selective gel solution comprises a xanthan and a crosslinker selected from the group consisting of metal and organic crosslinking agents.

3. The method of claim 1 wherein in step (c) the flushing agent comprises water and the gel breaker is a material selected from the group consisting of an enzyme and an oxidizing agent.

4. A method for recovering oil from a subterranean, oil-containing formation having relatively high permeability zones and relatively low permeability zones penetrated by at least one injection well and one production well in fluid communication with a substantial portion of the formation comprising the sequential steps of:
   (a) injecting a predetermined amount of a solidifiable selective gel solution comprising xanthan, chromium (in the 3+ state), sodium hydroxide and formaldehyde in a brine solution containing sodium chloride and calcium chloride into the formation via the injection well at a predetermined pressure sufficient to cause the gel solution to coat and temporarily plug the face of the relatively low permeability zones near the injection well without any significant amount of gel penetrating the relatively low permeability zones while allowing the gel solution to flow into the relatively high permeability zones;

(b) thereafter injecting a predetermined amount of a solidifiable non-selective gel solution comprising polyacrylamides, polysaccharides and unpolymerized acrylamide monomers into the formation via the injection well before the previously injected selective gel solution solidifies in the relatively high permeability zones that preferentially enters the relatively high permeability zones and allowing the injected non-selective gel to solidify and plug the relatively high permeability zones;

(c) injecting a predetermined amount of a flushing agent having a gel breaker into the formation via the injection well that removes the solidified selective gel from the face of the relatively low permeability zones thereby restoring permeability of the face of the relatively low permeability zones to fluids subsequently injected into the formation; and (d) injecting a flooding fluid into the formation via the injection well that preferentially enters the low permeability zones and recovering fluids including oil from the formation via the production well.

5. The method of claim 4 wherein in step (a) the selective gel solution comprises a xanthan and a crosslinker selected from the group consisting of metal and organic crosslinking agents.

6. The method of claim 4 wherein in step (c) the flooding agent comprises water and the gel breaker is a material selected form the group consisting of an enzyme and an oxidizing agent.

7. The method of claim 4 wherein in step (d) the flooding fluid is selected from the group consisting of steam, thickened water, carbon dioxides and an in-situ combustion front.

* * * * *